US007621390B2

(12) United States Patent
Ansaloni

(10) Patent No.: US 7,621,390 B2
(45) Date of Patent: Nov. 24, 2009

(54) METHOD AND DEVICE FOR CONVEYING ARTICLES ON A MACHINE FOR FILLING CAPSULES WITH AT LEAST ONE PHARMACEUTICAL PRODUCT

(75) Inventor: Angelo Ansaloni, Crespellano (IT)

(73) Assignee: MG 2 - S.r.l., Pianoro (IT)

( * ) Notice: Subject to any disclaimer, the term of this patent is extended or adjusted under 35 U.S.C. 154(b) by 159 days.

(21) Appl. No.: 11/832,515

(22) Filed: Aug. 1, 2007

(65) Prior Publication Data

US 2008/0056866 A1 Mar. 6, 2008

(30) Foreign Application Priority Data

Aug. 2, 2006 (EP) ................................. 06425557

(51) Int. Cl.
*B65G 47/84* (2006.01)
*B65G 29/00* (2006.01)

(52) U.S. Cl. ................. 198/441; 198/459.2; 198/471.1; 198/478.1; 53/272; 221/173; 221/163

(58) Field of Classification Search ................. 198/441, 198/459.2, 478.1, 471.1; 141/144, 145, 168; 53/272; 221/163
See application file for complete search history.

(56) References Cited

U.S. PATENT DOCUMENTS

| | | | | |
|---|---|---|---|---|
| 4,697,691 | A * | 10/1987 | Zodrow et al. | 198/426 |
| 6,595,249 | B2 * | 7/2003 | Gamberini | 141/179 |
| 7,073,658 | B2 * | 7/2006 | Biancoli et al. | 198/757 |
| 7,140,403 | B2 * | 11/2006 | Gamberini | 141/83 |
| 7,210,507 | B2 * | 5/2007 | Facchini | 141/146 |
| 2004/0149769 | A1 * | 8/2004 | Gamberini | 221/167 |

FOREIGN PATENT DOCUMENTS

| | | | |
|---|---|---|---|
| EP | 1637118 | A1 | 3/2006 |
| WO | 2004004626 | A2 | 1/2004 |

* cited by examiner

*Primary Examiner*—Mark A Deuble
(74) *Attorney, Agent, or Firm*—Seed IP Law Group PLLC

(57) ABSTRACT

A method and device for conveying articles on a continuously-operating machine for filling capsules with at least one pharmaceutical product, whereby each article is conveyed inside a respective seat on a transfer wheel, and is retained inside the seat by friction.

25 Claims, 3 Drawing Sheets

METHOD AND DEVICE FOR CONVEYING ARTICLES ON A MACHINE FOR FILLING CAPSULES WITH AT LEAST ONE PHARMACEUTICAL PRODUCT

BACKGROUND

1. Technical Field

The present invention relates to a method of conveying articles on a machine for filling capsules with at least one pharmaceutical product.

More specifically, the present invention relates to a method of conveying articles, each defined by a capsule comprising a bottom shell and a top shell closing the bottom shell, or by the bottom shell of a capsule, or by the top shell of a capsule. In the following description, the articles referred to are top shells of capsules, to which reference is made purely by way of example.

2. Description of the Related Art

In the pharmaceutical industry, a machine is known for filling capsules, each comprising a bottom shell, and a top shell closing the bottom shell.

The machine normally comprises a first wheel for correctly positioning the capsules vertically, with the top shells on top of the relative bottom shells, and for opening the capsules; a conveyor line for receiving the bottom shells from the first wheel and feeding them through at least one filling station; a second wheel for receiving the top shells from the first wheel; and a third wheel for receiving the bottom shells from the conveyor line and the top shells from the second wheel to close each bottom shell with the relative top shell.

The second wheel is connected to the first and third wheel at respective transfer stations, has at least one seat for a top shell, and is mounted to rotate continuously about a respective longitudinal axis to feed the seat through the transfer stations.

The seat is normally connected to a pneumatic suction device, which allows the seat to receive the top shell from the first wheel and feed it between the transfer stations, and which is deactivated to permit transfer of the top shell from the seat to the third wheel.

Known capsule filling machines of the type described above have various drawbacks, mainly due to the pneumatic suction device making the machines relatively complex, bulky, and expensive.

Known capsule filling machines of the type described above also have a further drawback when filling capsules with a powdered pharmaceutical product. That is, to prevent the powdered pharmaceutical product dispersed inside the machine from being inhaled by maintenance and cleaning personnel at the end of each operating cycle of the machine, the pharmaceutical produce is stabilized by a water spray, the effectiveness of which, however, is seriously impaired by the action of the pneumatic suction device, which tends to retain part of the pharmaceutical product inside the machine.

BRIEF SUMMARY

It is an object of the present invention to provide a method of conveying articles on a machine for filling capsules with at least one pharmaceutical product, designed to eliminate the aforementioned drawbacks.

According to the present invention, there is provided a method of conveying articles on a machine for filling capsules with at least one pharmaceutical product, as claimed in the attached Claims.

The present invention also relates to a device for conveying articles on a machine for filling capsules with at least one pharmaceutical product.

According to the present invention, there is provided a device for conveying articles on a machine for filling capsules with at least one pharmaceutical product, as claimed in the attached Claims.

BRIEF DESCRIPTION OF THE SEVERAL VIEWS OF THE DRAWINGS

A non-limiting embodiment of the present invention will be described by way of example with reference to the accompanying drawing, in which.

DETAILED DESCRIPTION

Figure 1:
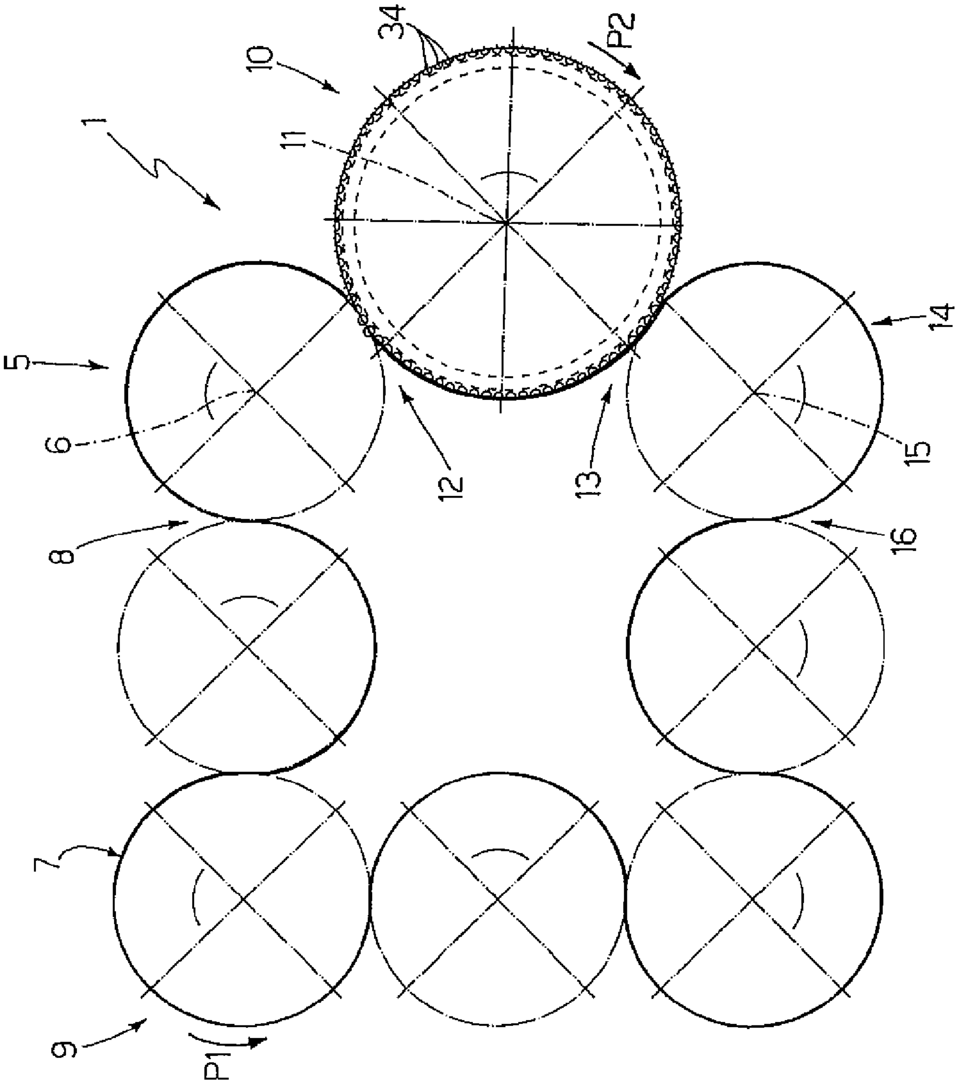
FIG. 1 shows a schematic plan view of a preferred embodiment of the capsule filling machine according to the present invention.

Number 1 in FIG. 1 indicates as a whole a machine for filling known capsules 2 (FIG. 2) with at least one pharmaceutical product, in particular a powdered pharmaceutical product. Each capsule 2 comprises a substantially cup-shaped bottom shell 3, and a top shell 4 closing bottom shell 3.

Machine 1 comprises an orienting and opening wheel 5, which is mounted to rotate continuously about a respective longitudinal axis 6 perpendicular to the FIG. 1 plane, receives the empty, closed capsules 2 successively, positions each capsule 2 vertically with top shell 4 on top of bottom shell 3, and opens each capsule 2 by detaching top shell 4 from bottom shell 3.

Bottom shells 3 are received successively by a known conveying device 7, which is connected to wheel 5 at a first transfer station 8, and feeds bottom shells 3 along a given path P1 and through at least one filling station 9 having at least one metering device (not shown) for feeding the pharmaceutical product into bottom shells 3.

Top shells 4 are received successively by a transfer wheel 10, which is mounted to rotate continuously about a respective longitudinal axis 11 parallel to axis 6, is connected to wheel 5 at a second transfer station 12, and feeds top shells 4 to a third transfer station 13, where top shells 4 are transferred to a mating and closing wheel 14, which is mounted to rotate continuously about a respective longitudinal axis 15 parallel to axes 6 and 11, and is in turn connected to conveying device 7 at a fourth transfer station 16 to successively receive bottom shells 3.

Wheels 5, 10 and 14 are designed and operated to feed each top shell 4 between stations 8 and 16 along a path P2 of substantially the same length as path P1, and therefore in time with the relative bottom shell 3, and so enable wheel 14 to close capsules 2 previously opened on wheel 5.

Figure 2:
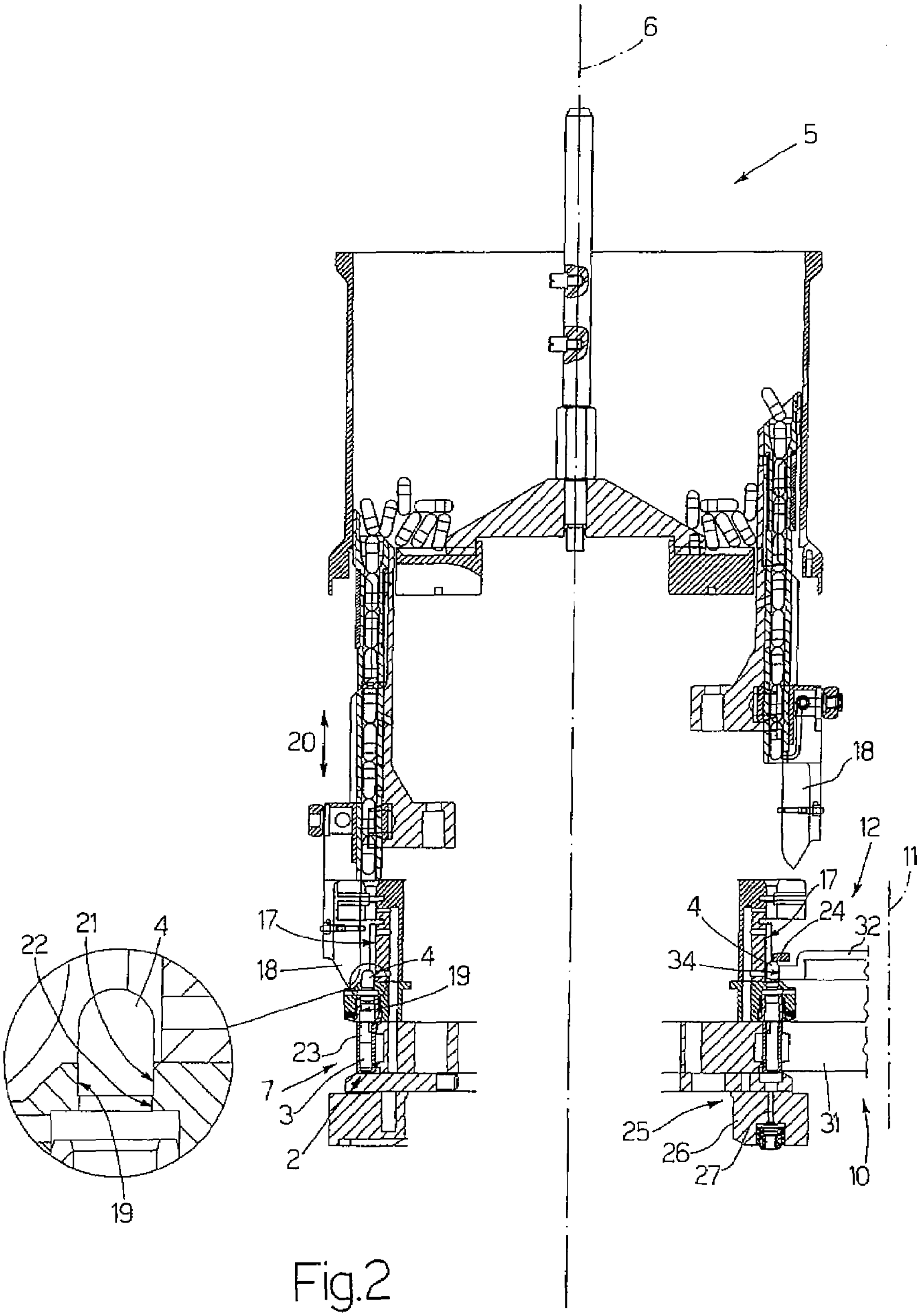
FIG. 2 shows a schematic longitudinal section of a first detail of the FIG. 1 machine.

As shown in FIG. 2, wheel 5 comprises a number of top seats 17 equally spaced about axis 6 and open radially outwards. Each seat 17 receives a respective capsule 2, and is closed radially outwards by a respective orienting member 18 for positioning capsule 2 vertically with top shell 4 on top of bottom shell 3.

Once oriented correctly inside seat 17, capsule 2 drops down into a tubular bottom seat 19, which is aligned with seat 17 in a vertical direction 20 parallel to axis 6, and comprises a wide top portion 21 for retaining top shell 4 and a narrow bottom portion 22, through which bottom shell 3 is sucked into a respective pocket 23 on conveying device 7.

At transfer station 12, top shells 4 are expelled in direction 20 from portions 21 of respective bottom seats 19, along respective top seats 17, and onto a stop member 24, mounted crosswise to direction 20, by a stream of compressed air directed onto top shells 4 by a fixed pneumatic distributor 25.

Distributor 25 comprises an annular plate 26 mounted, coaxially with axis 6, beneath conveying device 7, and having a conduit 27, which extends, parallel to direction 20, through plate 26, is connected in fluidtight manner with the pocket 23 traveling through station 12, and is connected pneumatically to a known compressed-air feed device not shown.

Figure 3:
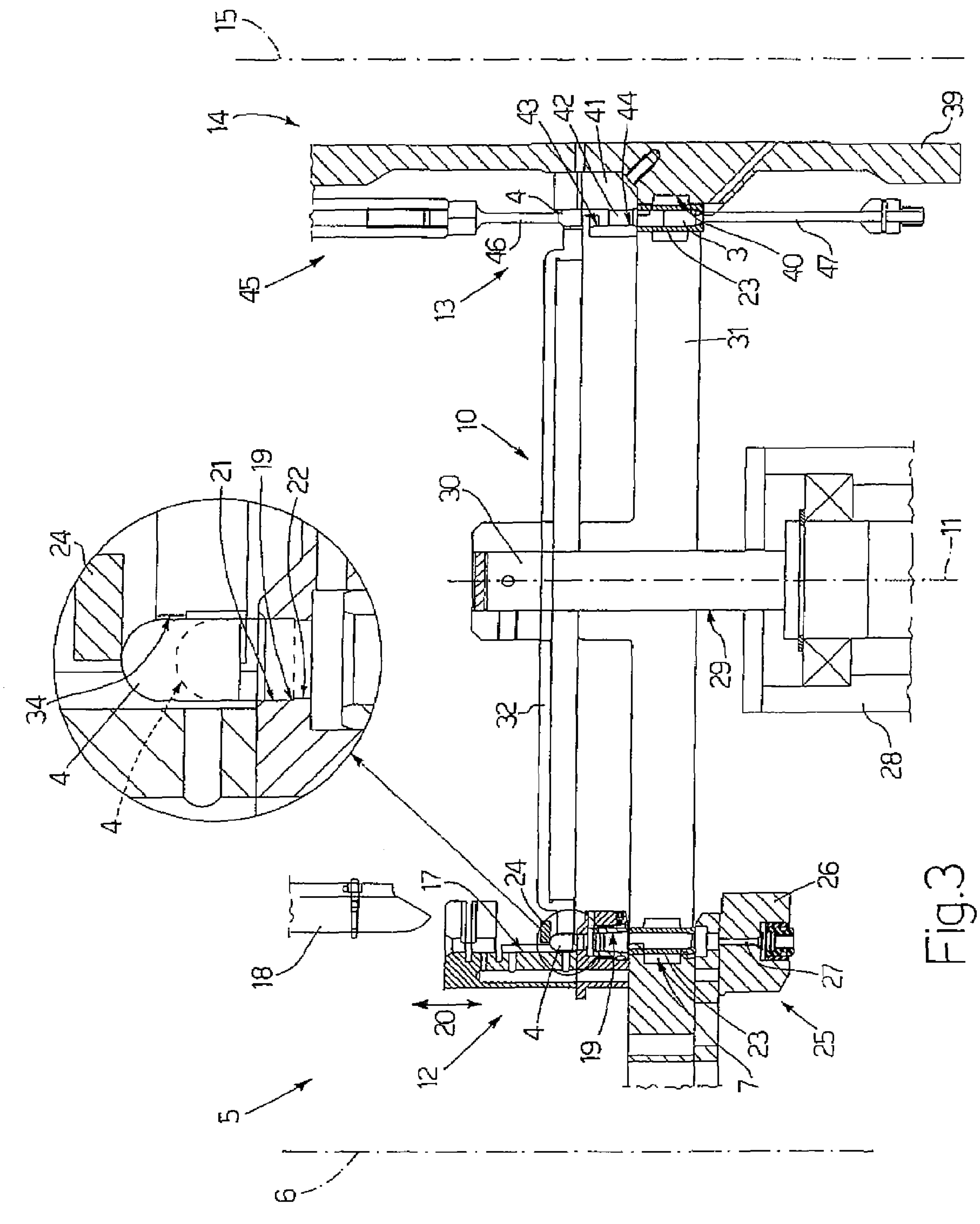
FIG. 3 shows a schematic longitudinal section of a second detail of the FIG. 1 machine.

With reference to FIG. 3, wheel 10 comprises a tubular column 28 coaxial with axis 11; and a shaft 29 which engages column 28 in rotary and axially fixed manner, is rotated about axis 11 and with respect to column 28 by a known drive device not shown, and has a top end 30 projecting outwards of column 28.

End 30 of shaft 29 supports a bottom sprocket 31 forming part of conveying device 7 and a top disk 32, which is fitted to end 30 coaxially with axis 11, is bounded externally by a substantially cylindrical lateral surface 33 (FIG. 4) coaxial with axis 11, and has a number of peripheral seats 34, which are equally spaced about axis 11, are open radially outwards at surface 33, and are open axially in direction 20.

Figure 4:
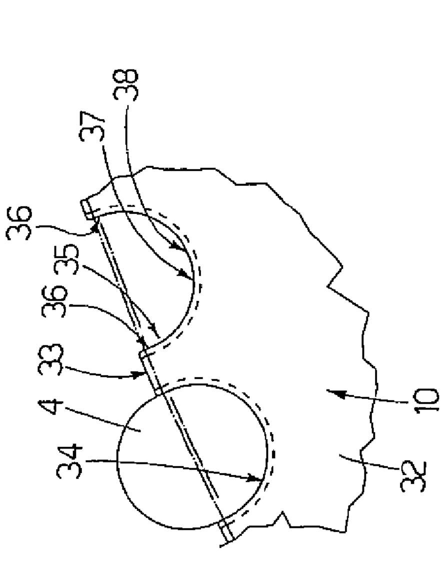
FIG. 4 shows a larger-scale plan view of a detail in FIG. 3.

As shown in FIG. 4, each seat 34 is tangentially narrower than the diameter of a top shell 4, and comprises, as of surface 33, an outer portion 35 bounded by two parallel flat faces 36; and an inner portion 37 bounded by a semicylindrical surface 38 connected to faces 36.

With reference to FIG. 3, wheel 14 comprises a sleeve 39 coaxial with axis 15, and on the outer surface of which are formed a bottom sprocket 40 forming part of conveying device 7 and a top disk 41 having a number of tubular seats 42 equally spaced about axis 15, and each comprising a respective wide top portion 43 for retaining a respective top shell 4, and a narrow bottom portion 44 for receiving a respective bottom shell 3 from conveying device 7 as described in detail below.

Each seat 42 is associated with a transfer unit 45 comprising a top pusher 46 and a bottom pusher 47, which are aligned with each other and with seat 42 in direction 20, and are connected in sliding manner to sleeve 39 to move linearly in direction 20 with respect to sleeve 39 and under the control of a known cam actuating device not shown.

Operation of machine 1 will now be described with reference to FIGS. 2, 3, 4 and to one top shell 4 only, and as of the instant in which:

the top shell 4 considered is housed inside wide top portion 21 of respective seat 19; and seat 19 is fed by wheel 5 through transfer station 12 in time with a relative seat 34.

At station 12, top shell 4 is transferred from seat 19 to seat 34 by first expelling top shell 4 upwards in direction 20 from portion 21 of seat 19, along relative top seat 17, and onto stop member 24 by means of the stream of compressed air directed onto top shell 4 through conduit 27 and relative pocket 23.

Once top shell 4 is lifted onto member 24, seats 19 and 34 are positioned facing each other with the interposition of top shell 4, which is first pressed between faces 36 of outer portion 35, is then inserted inside inner portion 37, and is finally retained inside seat 34 by friction.

At this point, top shell 4 and seat 34 are fed by wheel 10 through transfer station 13 in time with a relative seat 42.

At station 13, top shell 4 is released from seat 34 by top pusher 46, and is pushed down by pusher 46 into the wide top portion 43 of seat 42 to close relative bottom shell 3, which is released from respective pocket 23 by bottom pusher 47, and is pushed up by pusher 47 into the narrow bottom portion 44 of seat 42.

Top shells 4 being retained by friction inside respective seats 34, machine 1 has several advantages, mainly due to transfer wheel 10 having no pneumatic suction devices, and therefore being relatively straightforward and cheap, and requiring relatively little maintenance.

In alternative embodiments not shown, transfer wheel 10 with seats 34 may obviously be used to convey whole capsules 2 or bottom shells 3 of capsules 2.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of conveying articles on a machine for filling capsules with at least one pharmaceutical product, the machine comprising a first wheel having at least one first seat for an article; the method comprising:

moving the first wheel continuously about a respective longitudinal first axis to receive the article at a loading station, and to release the article at an unloading station, the first wheel being bounded by a lateral surface substantially coaxial with said first axis, the first seat being open radially outwards, and comprising, as of the lateral surface, an outer portion opening outwards at the lateral surface and bounded by two substantially flat, parallel faces, and an inner portion bounded by a substantially semicylindrical wall connected to the faces of the outer portion; and retaining the article inside the first seat by friction.

2. The method as claimed in claim 1, and also comprising: fixing the article inside the first seat.

3. The method as claimed in claim 1, wherein the machine comprises a second wheel mounted to rotate continuously about a respective longitudinal second axis, and having at least one second seat for the article; the method also comprising:

moving said first and said second seat in time with each other through said loading station to transfer the article from the second seat into the first seat.

4. The method as claimed in claim 3, and also comprising: conveying the article inside a third seat carried by said second wheel; and transferring the article from the third seat into the second seat in a direction parallel to said second axis.

5. The method as claimed in claim 4, and also comprising: transferring the article pneumatically from the third seat into the second seat.

6. The method as claimed in claim 4, and also comprising: arresting travel of the article from the third seat into the second seat by means of a stop member.

7. The method as claimed in claim 6, and also comprising: moving the article from the third seat into the second seat and onto said stop member by means of a pneumatic blow device.

8. The method as claimed in claim 1, wherein the machine comprises a third wheel mounted to rotate continuously about a respective longitudinal third axis, and having at least one fourth seat for the article; the method also comprising:

moving said first and said fourth seat in time with each other through said unloading station to transfer the article from the first seat into the fourth seat.

9. The method as claimed in claim 8, and also comprising: releasing the article from the first seat, and moving the article into the fourth seat in a direction parallel to said first axis.

10. The method as claimed in claim 1, wherein each said article is defined by a capsule.

11. The method as claimed in claim 1, wherein each capsule comprises a bottom shell, and a top shell closing the bottom shell; each said article being defined by a top shell of a capsule.

12. A device for conveying articles on a machine for filling capsules with at least one pharmaceutical product, the device comprising:

a first wheel having at least one first seat for an article;

a loading station; and an unloading station, the first wheel being mounted to rotate continuously about a respective longitudinal first axis to receive the article at the loading station and to release the article at the unloading station, the first seat being designed to retain the article by friction, the first wheel being bounded by a lateral surface substantially coaxial with said first axis, the first seat being open radially outwards, and comprising, as of the lateral surface, an outer portion opening outwards at the lateral surface and bounded by two substantially flat, parallel faces, and an inner portion bounded by a substantially semicylindrical wall connected to the faces of the outer portion.

13. A device for conveying articles on a machine for filling capsules with at least one pharmaceutical product, the device comprising:

a first wheel having at least one first seat for an article;

a loading station; and an unloading station, the first wheel being mounted to rotate continuously about a respective longitudinal first axis to receive the article at the loading station and to release the article at the unloading station, the first seat being designed to retain the article by friction, the first seat being tangentially narrower than a diameter of the article.

14. The device as claimed in claim 13, wherein the first seat is open axially.

15. The device as claimed in claim 13, and also comprising a second wheel, which has at least one second seat for the article, is connected to the first wheel at the loading station, and is mounted to rotate continuously about a respective second axis, substantially parallel to the first axis, to move the second seat through the loading station in time with the first seat.

16. The device as claimed in claim 15, wherein the second wheel also comprises at least one third seat for the article; a first transfer unit transferring the article from the third seat into the second seat.

17. The device as claimed in claim 16, wherein the first transfer unit comprises a pneumatic device for moving the article from the third seat into the second seat in a direction parallel to said second axis.

18. The device as claimed in claim 16, wherein the first transfer unit also comprises a stop member for arresting travel of the article from the third seat into the second seat.

19. The device as claimed in claim 18, wherein the first transfer unit comprises a blow device connectable pneumatically to the third seat to transfer the article into the second seat and onto the stop member.

20. The device as claimed in claim 13, and also comprising a third wheel, which has at least one fourth seat for the article, is connected to the first wheel at the unloading station, and is mounted to rotate continuously about a respective third axis, substantially parallel to the first axis, to move the fourth seat through the unloading station in time with the first seat.

21. The device as claimed in claim 20, and also comprising a second transfer unit for transferring the article from the first seat into the fourth seat.

22. The device as claimed in claim 21, wherein the second transfer unit comprises at least one pusher movable parallel to said first axis to release the article from the first seat and move the article into the fourth seat.

23. The device as claimed in claim 13, wherein each said article is defined by a capsule.

24. The device as claimed in claim 13, wherein each capsule comprises a bottom shell, and a top shell closing the bottom shell; each said article being defined by a top shell of a capsule.

25. A method of conveying articles on a machine for filling capsules with at least one pharmaceutical product, the machine including a first wheel having at least one first seat for an article, the method comprising:

moving the first wheel continuously about a respective longitudinal first axis;

receiving the article at a loading station;

releasing the article at an unloading station; and retaining the article inside the first seat by friction as the wheel rotates from the loading station to the unloading station, the first seat being tangentially narrower than a diameter of the article.

* * * * *